United States Patent [19]

Neale, III

[11] 4,173,349
[45] Nov. 6, 1979

[54] CONNECTOR INTERFACE SEALING ARRANGEMENT

[75] Inventor: Frank T. Neale, III, Warren, Ohio

[73] Assignee: General Motors Corporation, Detroit, Mich.

[21] Appl. No.: 936,199

[22] Filed: Aug. 24, 1978

[51] Int. Cl.² .................... F16J 15/32; H01R 3/04
[52] U.S. Cl. ........................................ 277/6; 277/191;
 339/60 C; 339/94 C
[58] Field of Search ............... 277/5, 6, 190, 191,
 277/208; 174/21 JS, 75 D, 84 S; 339/60 R, 60
 C, 94 R, 94 C, 177 R, 177 E, 273 R, 273 F

[56] References Cited

U.S. PATENT DOCUMENTS

| 3,143,384 | 8/1964 | Senior ................................. 339/60 R |
| 3,226,667 | 12/1965 | Senior ........................... 339/60 R X |
| 3,297,975 | 1/1967 | Pope .................................. 339/60 R |
| 3,534,322 | 10/1970 | Hoffa ................................. 339/94 R |
| 3,644,938 | 2/1972 | State ............................... 339/94 R X |
| 3,681,739 | 8/1972 | Kornick ............................. 339/94 C |
| 3,954,321 | 5/1976 | Casper ............................. 339/177 R |
| 4,123,131 | 10/1978 | Pearce et al. ..................... 339/117 R |

FOREIGN PATENT DOCUMENTS

| 2238268 | 2/1974 | Fed. Rep. of Germany ........ 339/94 C |
| 647952 | 10/1962 | Italy ........................................ 339/60 R |
| 372361 | 11/1963 | Switzerland .......................... 339/60 R |
| 217347 | 6/1924 | United Kingdom ................... 174/84 S |
| 490013 | 8/1938 | United Kingdom ................... 339/60 R |

Primary Examiner—Robert S. Ward, Jr.
Attorney, Agent, or Firm—F. J. Fodale

[57] ABSTRACT

An interface seal is mounted on a tubular end portion of a connector body. The interface seal has a biconic head having a converging section which is engaged and folded back toward a diverging section by a conical ramp at the end of a mating connector body when the connector bodies are locked together.

3 Claims, 4 Drawing Figures

U.S. Patent
Nov. 6, 1979
4,173,349
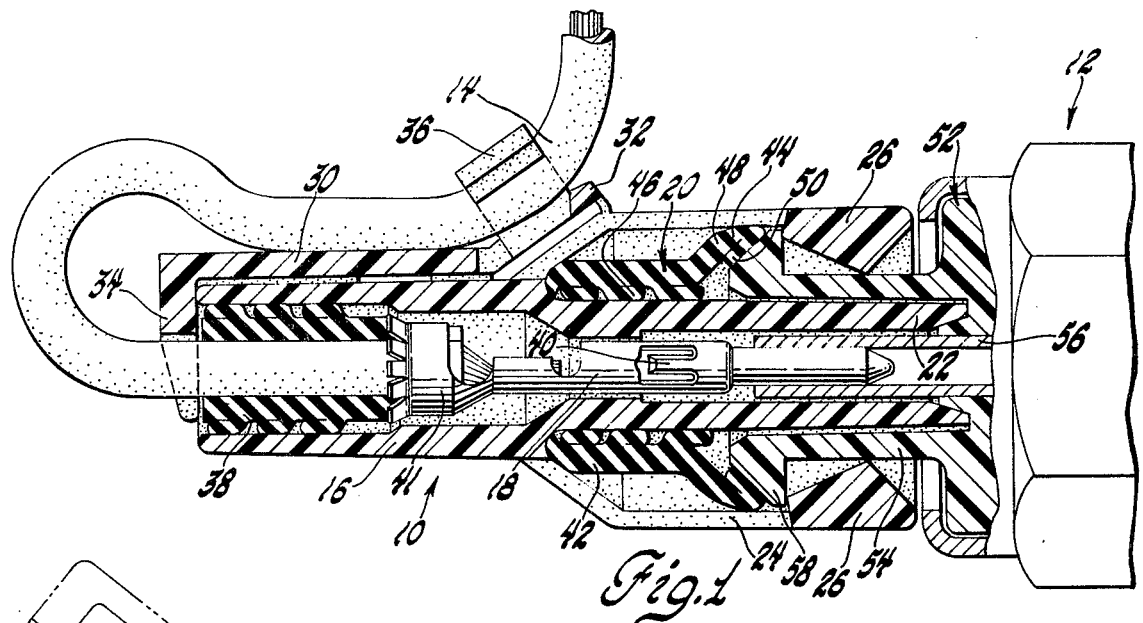
Fig. 1
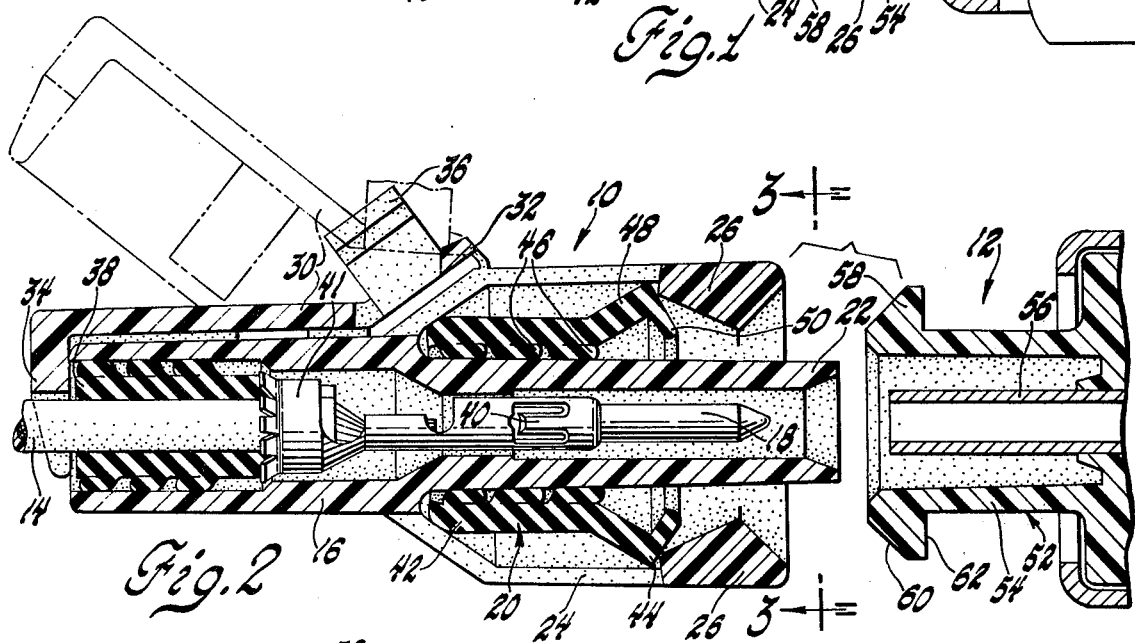
Fig. 2
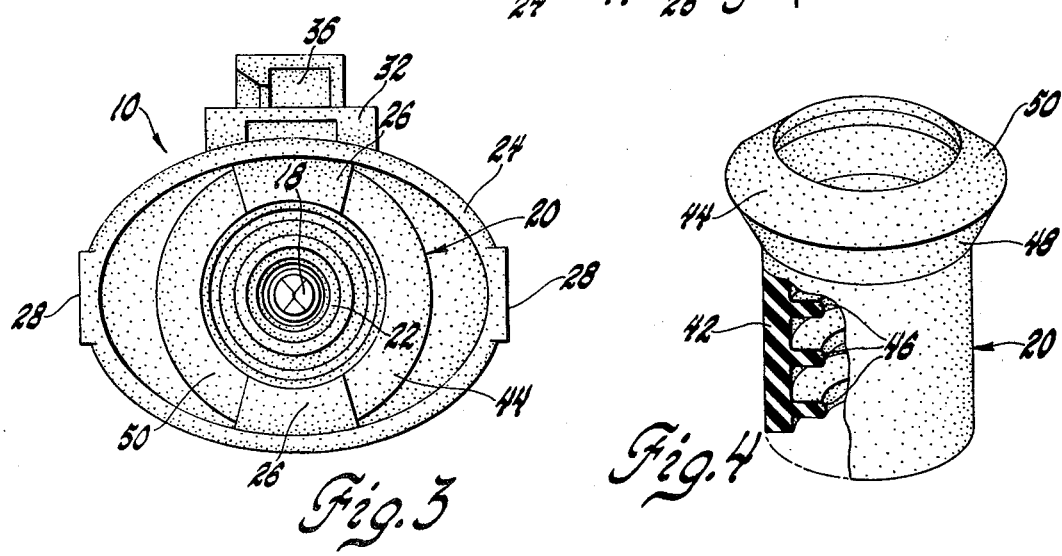
Fig. 3
Fig. 4

CONNECTOR INTERFACE SEALING ARRANGEMENT

This invention relates generally to a sealing arrangement and more particularly to an arrangement for sealing an interface between matable connector bodies.

An object of this invention is to provide an interface sealing arrangement for matable connector bodies which is very reliable if the connector bodies are properly mated.

Another object of this invention is to provide an interface sealing arrangement which takes advantage of the forces produced during locking engagement of the connector bodies.

Still another object of this invention is to provide an interface sealing arrangement which accommodates misalignment of the mated connector bodies.

Yet another object of this invention is to provide an interface sealing arrangement which compensates for temperature related pressure differentials created during operation.

Other objects and features of the invention will become apparent to those skilled in the art as the disclosure is made in the following detailed description of a preferred embodiment of the invention as illustrated in the accompanying sheet of drawing in which:

FIG. 1 is a longitudinal section of mated electrical connectors having an interface sealing arrangement in accordance with this invention;

FIG. 2 is a longitudinal section showing the electrical connectors of FIG. 1 in a disconnected or nonmated position;

FIG. 3 is a section taken substantially along the line 3—3 of FIG. 2 looking in the direction of the arrows; and FIG. 4 is a perspective, partially sectioned view of the interface seal shown in FIGS. 1, 2 and 3.

Referring now to the drawing the interface sealing arrangement of this invention is illustrated in conjunction with electrical connectors indicated generally at 10 and 12. In this particular instance, the electrical connector 10 is attached to the end of a lead wire 14 and the electrical connector 12 forms part of an electrical device such as a switch.

The electrical connector 10 comprises a molded connector body 16 of nylon or other suitable plastic dielectric material, a terminal 18 and an interface seal 20 of silicone rubber or other suitable elastomeric material.

The connector body 16 has a tubular end portion 22 which is surrounded by a radially spaced elliptical lock member 24. The elliptical lock member 24 has a pair of internal triangular lock projections 26 located on the minor diameter at its free or forward end and a pair of external finger pads 28 located on the major diameter at this same end. The tubular end portion 22 is preferably slightly tapered toward the free or forward end which projects beyond the elliptical lock member 24.

The connector body 16 further comprises a strain relief flap 30 integrally connected to the rearward portion of the elliptical lock member 24 by a flexible hinge 32. The flap 30 has a flanged end 34 which is grooved to permit passage of the lead wire 14 and an L-shaped bracket 36 which holds the lead wire 14 in a looped position.

The terminal 18 is a pin terminal of the type disclosed in U.S. Patent Application Ser. No. 880,439 filed by Robert G. Plyler and Lyle B. Suverison on Feb. 23, 1978 as a Continuation-in-part of Patent Application Ser. No. 798,569 filed May 19, 1977. The terminal 18 also attaches a seal sleeve 38 to the end of the lead wire 14. This feature is more particularly disclosed in U.S. Patent Application Ser. No. 912,835 filed by Harold G. Hawkins on June 5, 1978 as a Continuation of Patent Application Ser. No. 803,622 filed June 6, 1977. This invention is not particularly concerned with either terminal 18 per se or the attachment of the seal sleeve 38. Suffice it to say that the terminal 18 is inserted into an enlarged opening at the rear end of the connector body 16 and latched therein by the lock tangs 40 where the seal sleeve 38 attached to the lead wire 14 by the terminal crimp portion 41 provides a seal between the lead wire 14 and the enlarged opening at the rear end of the connector body 16. After the terminal 18 is latched in the connector body the flap 30 is moved from the phantom line position to the solid line position shown in FIG. 2 where the flanged end 34 cooperates with the end of the seal sleeve 38 to provide a strain relief or secondary lock for the terminal 18.

As noted earlier, this invention relates to the interface sealing arrangement. This arrangement comprises the interface seal 20 disposed on the tubular end portion 22 of the connector body 16 inwardly of the elliptical locking member 24. The interface seal 20 comprises a sleeve portion 42 which is about ⅔ of its length and an enlarged biconic head portion 44. The sleeve portion 42 has three circular, axially spaced, internal ribs 46 which are radial in their free state as shown in FIG. 4. The biconic head portion 44 comprises a diverging section 48 disposed at an angle of about 30° and a converging end section 50 which makes a right angle with the diverging section 48.

The interface seal 20 is mounted on the tubular end portion 22 with the ribs 46 bent axially outwardly for sealing engagement and rolling action along the tapered tubular end portion 22 as shown in FIG. 2.

The electrical connector 12 comprises a molded connector body 52 of nylon or other suitable plastic dielectric material. A sleeve terminal 56 is secured in the rearward portion of the connector body 52 and extends forwardly in cantilever fashion where it is surrounded by a shroud 54 forming an integral part of the connector body 52. The forward end of the shroud 54 has a radial lip 58 which provides a forward conical ramp 60 disposed at an angle of about 45° and a rearward lock shoulder 62. When the electrical connectors 10 and 12 are mated as shown in FIG. 1, the shroud 54 receives the forward tubular end portion 22 of the connector body 16 and the radial lip 58 is snapped past the triangular lock projections 26. During locking, the elliptical locking member 24 resiliently deforms to a round shape to permit the passage of the radial lip 58 and locking may be assisted by applying pressure to the finger pads 28. As the radial lip passes the peak of the locking projections 26, the conical ramp 60 engages the converging end section 50 of the interface seal 20. In simultaneous motion, the interface seal 20 is forced back on the tubular end portion 22 and the converging end section 50 rolls inward and back against the diverging conical section 48 as the radial lip 58 snaps into place behind the triangular lock projections 26. When the interface seal 20 is forced back, the three annular ribs 46 roll further back and provide an excellent multifaced surface seal at the interface with the tubular end portion 22. Additionally the diverging conical section 48 (originally disposed at an angle of about 30°) deforms uniformly outwardly to an angle of about 45° matching the angle of the conical ramp 60 and the folded-back converging end section 50 provides an excellent biased face seal at the conical ramp 60.

It should be noted that the converging end section 50 of the interface seal 20 begins sealing engagement with the conical ramp 60 while the radial lip 58 is engaging the downside of the locking projections 26. This feature improves sealing reliability by taking advantage of the forces produced by the locking projections 26 which assist connector locking to also provide the seal seating action.

The biconic head portion 44 also accommodates misalignment of the locked assembly. If the axes of the connector bodies 16 and 52 do not align at mating (i.e., connector body 16 slightly canted on connector body 52), the self biasing forces produced by deforming the diverging conical section 48 of the interface seal 20 outwardly to match the angle of the conical ramp 60 causes the converging end section 50 to remain in contact with the conical ramp 60 since the diverging conical section 48 tends to return to its original shape. Thus, as long as the connector bodies 16 and 52 are locked, the interface seal 20 maintains its integrity.

In addition, the envelope created in the biconic head portion 44 by rolling the converging end section 50 inward and back works as a miniature bellows to compensate for temperature related pressure differentials created during operation of the electrical connector. That is, when a pressure differential is created in or near the interface between the interface seal 20 and the connector bodies, the "envelope" expands or contracts to prevent atmospheric pressure from forcing environmental contaminants into the interior of the connector bodies.

I wish it to be understood that I do not desire to be limited to the exact details of construction shown and described, for obvious modifications will occur to a person skilled in the art.

What is claimed is:

1. An interface sealing arrangement for matable connector bodies comprising:
   a first connector body having a tubular end portion,
   an interface seal having a sleeve portion at one end and a biconic head portion at an opposite end,
   said sleeve portion sealingly engaging a peripheral surface of the tubular end portion and said biconic head portion terminating in a converging end section radially spaced from the tubular end portion, and
   a second connector body including a shroud having a conical ramp at one end,
   said conical ramp engaging and folding the converging end section back toward a diverging section of the biconic head portion when said connector bodies are mated.

2. An interface sealing arrangement for matable connector bodies comprising:
   a first connector body having a tubular end portion,
   an interface seal having a sleeve portion at one end and a biconic head portion at an opposite end,
   said sleeve portion having a plurality of internal ribs sealingly engaging a peripheral surface of the tubular end portion at locations spaced from a free end thereof and said biconic head portion terminating in a converging end section which is radially spaced from the tubular end portion and axially spaced from the free end thereof, and
   a second connector body including a shroud having a conical ramp at one end,
   said shroud receiving said tubular portion with said conical ramp engaging and folding the converging end section back toward a diverging section of the biconic head portion when said connector bodies are mated.

3. An interface sealing arrangement for matable connector bodies comprising:
   a first connector body having a tubular end portion and a lock member including triangularly shaped lock projections adjacent a free end of the tubular end portion,
   an interface seal disposed on the tubular end portion inwardly of the lock member, said interface seal having a sleeve portion at one end and a biconic head portion at an opposite end,
   said sleeve portion sealingly engaging a peripheral surface of the tubular end portion and said biconic head portion terminating in a converging end section radially spaced from the tubular end portion, and
   a second connector body including a shroud having a radial lip comprising a forward diverging conical ramp and a rearward lock shoulder at one end,
   said conical ramp engaging and folding the converging end section back toward a diverging section of the biconic head portion as said radial lip passes the lock projections during mating engagement of the connector bodies.

* * * * *